US008891941B2

(12) United States Patent
Abe et al.

(10) Patent No.: US 8,891,941 B2
(45) Date of Patent: Nov. 18, 2014

(54) EDITING APPARATUS, EDITING METHOD, AND EDITING PROGRAM (75) Inventors: Koichi Abe, Tokyo (JP); Shogo Tsubouchi, Tokyo (JP)

(73) Assignee: GVBB Holdings S.A.R.L., Luxembourg (LU)

( * ) Notice: Subject to any disclaimer, the term of this patent is extended or adjusted under 35 U.S.C. 154(b) by 554 days.

(21) Appl. No.: 12/734,411

(22) PCT Filed: Nov. 6, 2008

(86) PCT No.: PCT/JP2008/003220
§ 371 (c)(1),
(2), (4) Date: Apr. 28, 2010

(87) PCT Pub. No.: WO2009/060615
PCT Pub. Date: May 14, 2009

(65) Prior Publication Data
US 2010/0254671 A1    Oct. 7, 2010

(30) Foreign Application Priority Data

Nov. 7, 2007    (JP) .................. 2007-289820

(51) Int. Cl.
*H04N 5/93*    (2006.01)
*H04N 5/76*    (2006.01)
*G11B 27/034*    (2006.01)
*H04N 5/77*    (2006.01)
*H04N 9/82*    (2006.01)
*H04N 5/781*    (2006.01)
*H04N 5/783*    (2006.01)
*H04N 5/765*    (2006.01)

(52) U.S. Cl.
CPC .............. *G11B 27/034* (2013.01); *H04N 5/772* (2013.01); *H04N 5/76* (2013.01); *H04N 9/8205* (2013.01); *H04N 5/781* (2013.01); *H04N 5/783* (2013.01); *H04N 5/765* (2013.01)
USPC ........................................................ 386/278

(58) Field of Classification Search
USPC .......... 386/239, 248, 278, 279, 286, 353, 354
See application file for complete search history.

(56) References Cited

U.S. PATENT DOCUMENTS 7,099,239 B2 *   8/2006   Ogikubo ................... 369/30.23
7,609,947 B2 *  10/2009   Ikeda et al. .................. 386/353
(Continued)

FOREIGN PATENT DOCUMENTS

CN    1431660 A    7/2003
CN    1929597 A    3/2007
(Continued)

OTHER PUBLICATIONS

EVS: "Multicam Software User's Manual Version 6.02.04 Nov. 2004", Internet Citation, Nov. 1, 2004, pp. 1-131.
Search Report Dated Apr. 6, 2009.
English Translation of First Office Action regarding Chinese Patent Application No. 2008801152767.
English Translation of Second Office Action regarding Chinese Patent Application No. 2008801152767.
(Continued)

*Primary Examiner* — Tat Chio
(74) *Attorney, Agent, or Firm* — Arent Fox LLP (57) ABSTRACT Herein disclosed is an editing apparatus and an editing method for editing a moving image. An editing apparatus, comprises: a means for playing back a moving image; a switching means for switching playback between a first moving image and a second moving image; and a means for, during playback of the first moving image, in response to switching playback from the first moving image to the second moving image, setting a reference point at a last played back position of the first moving image. The editing apparatus further comprises: a controller for receiving an instruction from a user, wherein the switching means carries out the switching from the first moving image to the second moving image, in response to the controller receiving a selection of the second moving image from the user.

11 Claims, 8 Drawing Sheets

(56) References Cited

U.S. PATENT DOCUMENTS

| | | |
|---|---|---|
| 2003/0165324 A1 | 9/2003 | O'Connor et al. |
| 2005/0060755 A1 | 3/2005 | Daniels |
| 2007/0182864 A1 | 8/2007 | Stoneham et al. |

FOREIGN PATENT DOCUMENTS

| | | |
|---|---|---|
| EP | 1266521 | 7/2002 |
| JP | 2002125152 A | 4/2002 |
| JP | 2004274627 A | 9/2004 |
| JP | 200530392 A | 10/2005 |
| JP | 2006222705 A | 8/2006 |

OTHER PUBLICATIONS

English Translation of Third Office Action regarding Chinese Patent Application No. 2008801152767.

IPRP dated May 11, 2010 with Written Opinion regarding PCT Application No. PCT/JP2008003220.

Notice of Reason for Rejection dated Jan. 15, 2013 regarding Japanese Patent Application No. JP2010-531659.

Notice of Decision of Rejection dated Oct. 22, 2013 regarding Japanese Patent Application No. JP2010-531659.

Final Notice of Reasons for Rejection dated Jun. 10, 2014 regarding Japan Patent Application No. JP2010-531659.

* cited by examiner

EDITING APPARATUS, EDITING METHOD, AND EDITING PROGRAM

This application claims the benefit, under 35 U.S.C. §365 of International Application PCT/JP2008/003220, filed Nov. 6, 2008, which was published in accordance with PCT Article 21(2) on May 14, 2009 in English and which claims the benefit of Japanese application No. 2007-289820, filed Nov. 7, 2007.

TECHNICAL FIELD

The present invention relates to an editing apparatus, an editing method, and an editing program, and more particularly, to an editing apparatus, an editing method, and an editing program for editing a plurality of moving images which have been recoded or are being recoded, and playing back the edited moving images.

BACKGROUND ART

Conventionally, in the broadcasting field, especially in a live sport telecast and the like, to concatenate a plurality of scenes recorded by a plurality of camcorders or to change the duration of each of the scenes, the plurality of scenes are played back and edited using a recording/playback device including a recording medium allowing for a faster random access such as a hard disk device. While such a recording/playback device including a recording medium allowing for a faster random access is improved in convenience in comparison with a video tape recorder carrying out a sequential access, still much is left to be improved in terms of operability.

For improved operability, Japanese Unexamined Patent Application Publication No. H09-233430 discloses a device for recognizing an order and duration of a series of scenes to be played back and further editing the series of scenes, by, for example, displaying in chronological order the series of scenes to be played back in a bar chart having segments reflecting the duration of each of the scenes.

Patent Citation 1: Japanese Unexamined Patent Application Publication No. H09-233430

DISCLOSURE OF INVENTION

Technical Problem

In a live sport telecast, for example in a live baseball game broadcast, a controversial play or a home-run scene is often broadcasted immediately after it occurs. In this case, it is preferable that a plurality of moving images taken from a plurality of angles are edited and broadcasted before viewers lose interest.

In light of the abovementioned problems, an objective of the present invention is to provide an editing apparatus, an editing method and an editing program allowing quick editing of a plurality of moving images. Another objective of the present invention is to provide an editing apparatus, an editing method and an editing program allowing quick playback of such moving images.

Technical Solution

In accordance with a first aspect of the present invention, there is provided an editing apparatus, comprising: a switching means for switching playback between a first moving image and a second moving image; a playback means for playing back the moving image; and a means for, during playback of the first moving image, in response to switching playback from the first moving image to the second moving image, setting a reference point at a last played back position of the first moving image.

According to the present invention, the means for setting sets the reference point at the last played back position of the first moving image that has been played back only by switching from the first moving image to the second moving image using the switching means during playback of the first moving image. This eliminates an operation for setting the reference point, and it is possible to provide an editing apparatus allowing quick editing of a plurality of moving images. Moreover, the editing apparatus can set the reference point in the same manner even when there are more than two moving images, allowing quick editing of the moving images.

Further, according to the present invention, while the first and second moving image are edited, only one of the first and the second moving images is played back at one time. Therefore, it is possible to edit either of the first and second moving images while the moving image is decoded by a single decoder unit even when the first and second moving images are encoded, and to set the reference point. Moreover, this also applies to the case in which there are more than two moving images, and it is possible to edit each of the moving images while the moving image is decoded by the single decoder unit, and to set the reference point.

It should be noted that, the expression "during playback" includes cases where a moving image is played back in a certain speed, where a moving image is played back as a still image, and where a playback of a moving image is stopped after playing back the moving image as a still image. In addition, the expression "moving image" includes "moving image data", "moving image signal", and "clip" used in the present specification. Unless otherwise stated, the expressions are used similarly in the claims and specification of the present application.

Further, the editing apparatus according to the present invention may further comprise a playback point shifting means, wherein the playback point shifting means shifts, during playback of the second moving image, in response to switching playback from the second moving image to the first moving image, the playback point to the reference point of the first moving image from the second moving image, and the playback means plays back the first moving image from the reference point. The playback point shifting means shifts, in response to switching playback from the second moving image to the first moving image, the playback point to the reference point of the first moving image. Therefore, it is possible to quickly play back the first moving image from the reference point.

In accordance with another aspect of the present invention, there is provided an editing method, comprising: a step of playing back a first moving image; a step of switching playback to a second moving image during playback of the first moving image; and a step of setting a reference point at a last played back position of the first moving image in response to the switching to the second moving image.

According to the present invention, the reference point can be set at the last played back position of the first moving image that has been played back only by switching from the first moving image to the second moving image during playback of the first moving image. Therefore, it is possible to quickly set a reference point in the first moving image, allowing quick editing. Moreover, the reference point can be set in the same manner even when there are more than two moving images, allowing quick editing. Further, for the same reason as described above, even when the first and second moving images are encoded, it is possible to edit each of the moving images while the moving image is decoded by the single decoder unit, and to set the reference point.

In accordance with still another aspect of the present invention, there is provided an editing program that is executable by a computer to carry out the steps comprising: a step of playing back a first moving image; a step of switching playback to a second moving image during playback of the first moving image; and a step of setting, in response to the switching to the second moving image, a reference point at a last played back position of the first moving image.

According to the present invention, it is possible to realize an editing program having the same effects and advantages as the invention of the method described above.

Advantageous Effects

According to the present invention, an objective of the present invention is to provide an editing apparatus, an editing method and an editing program allowing quick editing of a plurality of moving images, and further provide an editing apparatus, an editing method and an editing program allowing quick playback of such moving images.

EXPLANATION OF THE NUMERAL REFERENCES

10 Editing system
100 Editing apparatus
101 Image server
111 Controller
261 Hard disk drive
271 CPU
281 Memory
341 Decoder

BEST MODE FOR CARRYING OUT THE INVENTION

Preferred embodiments of the present invention will be described below with reference to the accompanying drawings.

Figure 1:
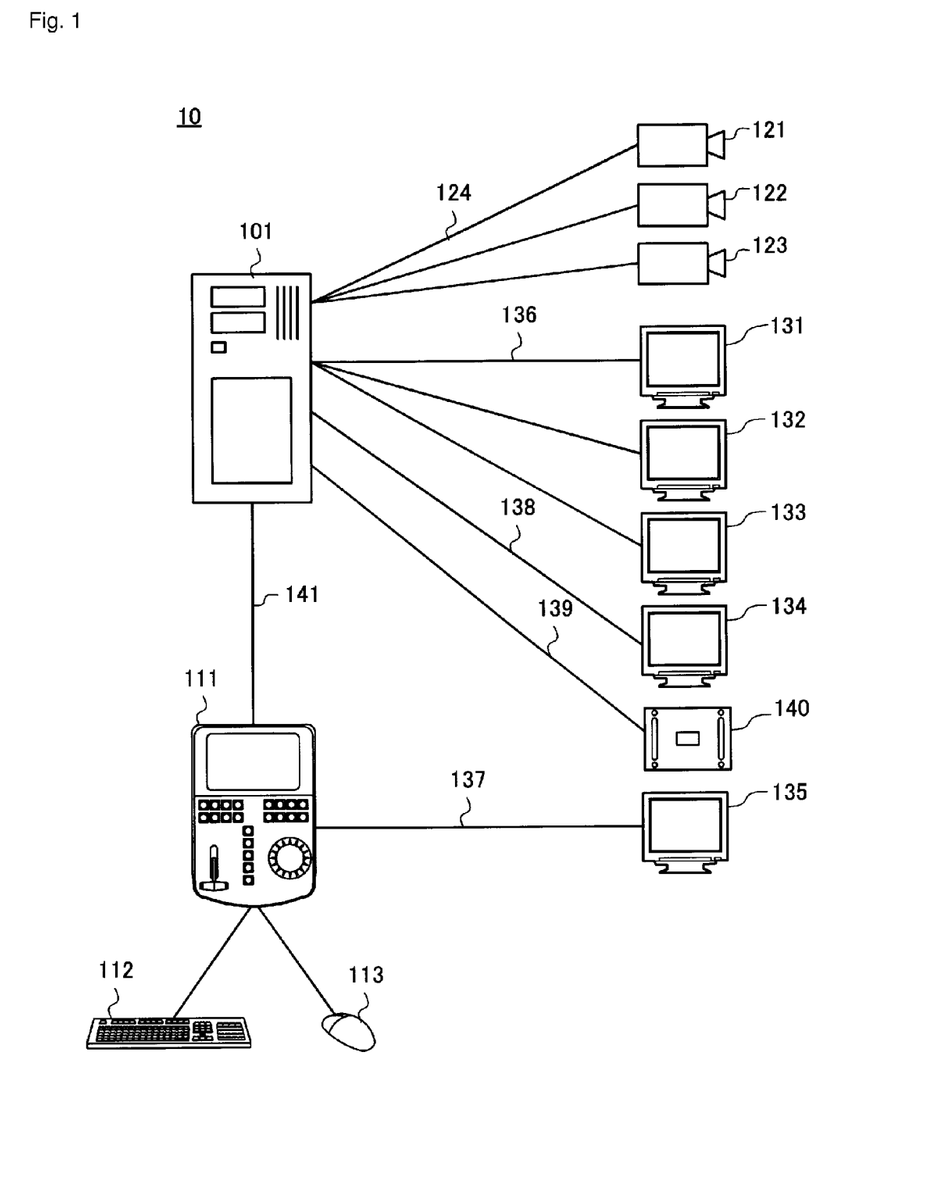
FIG. 1 is a block diagram showing an overview of an embodiment of an editing system including an editing apparatus according to the present invention.

FIG. 1 is a block diagram showing an overview of an editing system including an embodiment of an editing apparatus according to the present invention. As shown in FIG. 1, an editing system 10 is provided with an image server 101, a controller 111, a keyboard 112, a mouse 113, camcorders 121-123, camcorder monitors 131-133, decoder monitors 134, system monitors 135, and the like. Each of the components forming the editing system 10 is connected, using, for example, a LAN (Local Area Network) 141 to connect the image server 101 and the controller 111, a coaxial cable 124 to connect the image server 101 and the camcorders 121-123, a coaxial cable 136 to connect the image server 101 and the camcorder monitors 131-133, a VGA (Video Graphics Array) cable 138 to connect the image server 101 and the decoder monitor 134, a VGA cable 137 to connect the controller 111 and the system monitor 135, a coaxial cable 136 to connect the image server 101 and an output device 140, and so on. However, the method of connection is not limited thereto.

Furthermore, the present embodiment of the editing apparatus according to the present invention is provided with the image server 101 and the controller 111, as will be described later. It should be noted that, that the image server 101 may also be configured as a single unit integrating the controller 111.

The image server 101 encodes the moving image signal received from the camcorders 121-123, and stores the encoded signal as moving image data. Furthermore, the image server 101 decodes the moving image data into the moving image signal, and sends the moving image signal to the decoder monitor 134. The decoder monitor 134 displays moving images based on the moving image signal received from the image server 101. The camcorder monitors 131-133 display the moving images captured by the camcorders 121-123. Furthermore, the image server 101 may also send the moving image signal to, for example, the output device 140 for broadcasting.

The controller 111 sends and receives via the image server 101 and the LAN 141, and displays a user interface on the display screen (shown in FIG. 3), based on a signal sent from the image server 101 and a user input. Furthermore, the controller 111 converts the user input that has been inputted by the mouse 113, by the keyboard 112 or by the controller 111 itself into a signal, and sends the signal to the image server 101. Still further, the controller 111 sends the signal for displaying the user interface to the system monitor 135 via the VGA cable 137.

The camcorders 121-123 capture images of a target subject and output the images as a moving image signal, and send the moving image signal to the image server 101 via the coaxial cable 124. The camcorders 121-123 may take images of a single target subject from different angles or using different lenses having different field angles, and may include a normal camcorder and a camcorder capable of high-speed photographing. Furthermore, the camcorders 121-123 may take images of different target subjects.

Figure 2:
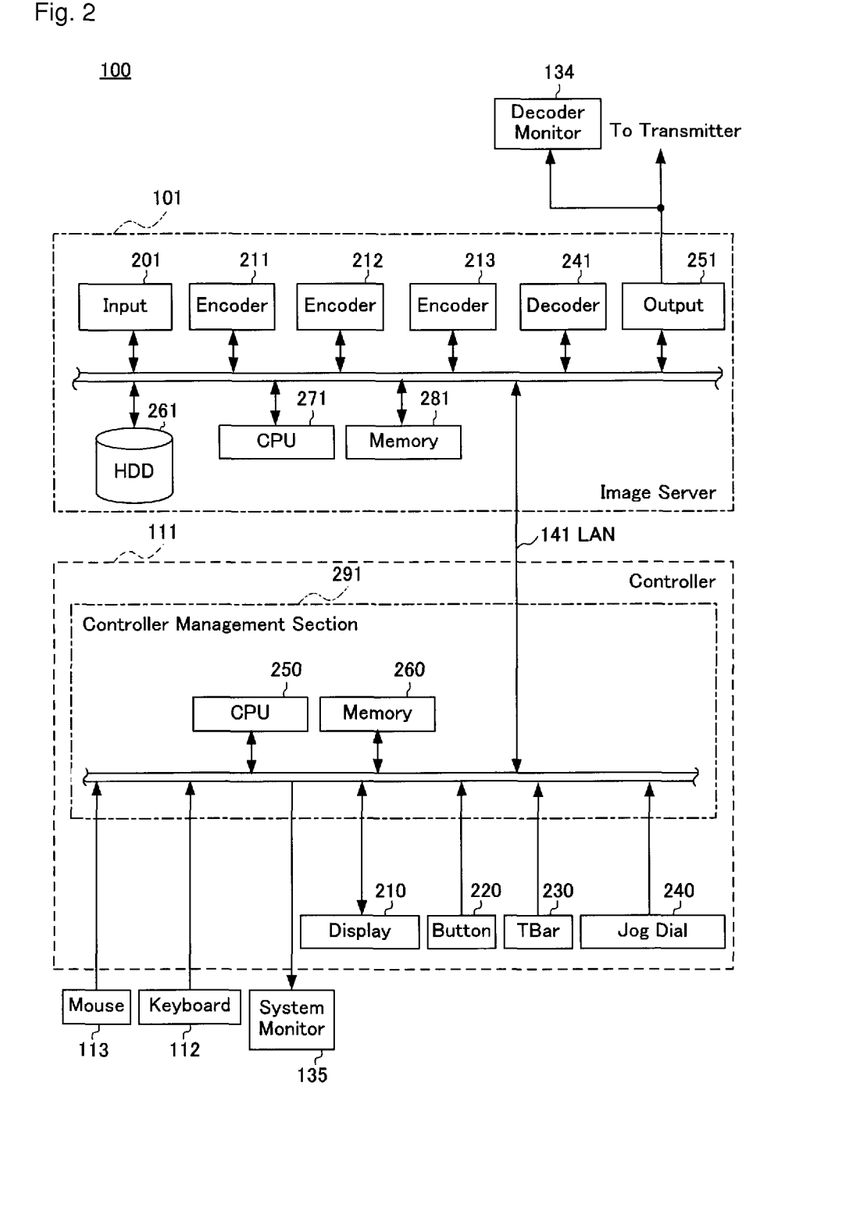
FIG. 2 is a block diagram of the embodiment of the editing apparatus according to the present invention.

FIG. 2 is a block diagram of the embodiment of an editing apparatus according to the present invention. As shown in FIGS. 1 and 2, an editing apparatus 100 is provided with the image server 101, the controller 111, the keyboard 112, the mouse 113, the system monitor 135, the decoder monitor 134, and the like. Although the image server 101 and the controller 111 are constructed separately, it should be noted that the image server 101 and the controller 111 may be constructed as a single unit.

The image server 101 is provided with an input 201, encoders 211-213, a decoder 241, an output 251, a hard disk drive 261, a CPU 271, and a memory 281, which are communicably connected to each other through a bus.

The input 201 receives the moving image signal from the camcorders 121-123. The moving image signal may be, for example, a moving image signal stored on a video recording apparatus such as a video tape recorder (VTR) or an optical disk device. The input 201 may receive moving image data that has been externally encoded.

The encoders 211-213 encode the moving image signal sent from the input 201 into encoded moving image data that includes time information. Furthermore, the encoders 211-213 may also read out and encode a moving image signal stored on the hard disk drive 261.

The decoder 241 reads out and decodes the encoded moving image data from the hard disk drive 261, and sends the moving image signal to the output 251 or the like. Furthermore, the decoder 241 may directly receive and decode the encoded image data supplied to the input 20.

The output 251 receives the moving image signal that has been decoded from the decoder 241, and outputs the signal to the decoder monitor 134 and the transmitter 140. The output 251 outputs the moving image signal in a format compliant with a device that is connected to the output 251. For example, a VGA signal is outputted from the output 251 to the decoder monitor 134, and an HD-SDI signal is outputted from the output 251 to the transmitter 140. Further, the output 251 may receive and output the moving image signal that has been read from the input 201 and the hard disk drive 261, or the encoded moving image data from the input 201 and the hard disk drive 261, or may receive the encoded moving image data from the encoders 211-213 and output the received encoded moving image data.

The hard disk drive 261 stores programs that are to be executed by the CPU 271 and the encoded moving image data sent from the encoders 211-213. Furthermore, the hard disk drive 261 may directly store the moving signal sent from the input 201. The hard disk drive 261 may be provided within the image server 101, externally to the image server 101, or both. Still further, while the present embodiment of the present invention describes the hard disk drive 261 for explanatory purposes, any memory device, for example, such as a tape drive, an optical disk drive, a large volume memory, or any combination thereof may be used other than a hard disk drive, as long as such a device is capable of storing moving image data or a moving image signal.

The CPU 271 reads out programs stored in the memory 281, and carries out various processing. Examples of the programs executed by the CPU 271 include applications for editing or playing back moving image data, an OS (Operating System) for controlling devices connected to the bus, and so on.

The memory 281 stores programs that have been read out from the hard disk drive 261. Examples of the programs include applications for editing or playing back moving image data in response to an input and an output from the controller 111, and the OS for controlling the devices connected to the bus, and so on. Furthermore, the memory 281 may store moving image signals and moving image data from the devices connected to the bus.

The decoder monitor 134 is connected to the output 251, and displays a moving image based on the moving image signal, such as a VGA signal, sent from the output 251. While the decoder monitor 134 is used to monitor the content of the moving image signal in preview playback or in playback for broadcasting as will be described later, the decoder monitor 134 is not necessarily essential for the image processing system 100.

Furthermore, the controller 111 is provided with a controller management section 291, a display 210, button group 220, a T-bar 230, and a jog dial 240.

The controller management section 291 is provided with a CPU 250 and a memory 260. The controller management section 291 sends and receives a signal to and from the image server 101, sends a signal for displaying the user interface to the display 210 and the system monitor 135, and sends input data or a request command received as an input from the button group 220, the T-bar 230, the jog dial 240, the keyboard 112, and the mouse 113 to the image server 101.

Figure 3:
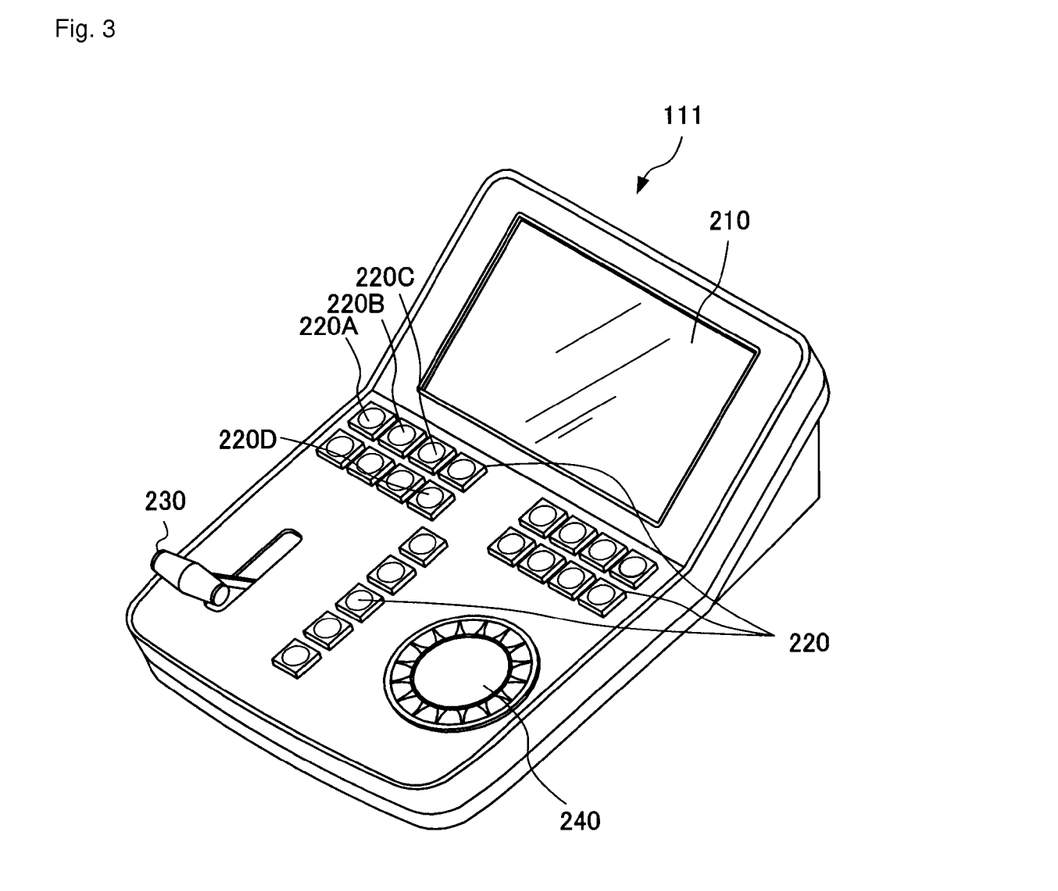
FIG. 3 is a perspective view of a controller.

FIG. 3 is a perspective view of the controller 111. As shown in FIGS. 3 and 2, the controller 111 is provided with the display 210 on an upper portion of the controller 111, the button group 220 arranged in arrays in a central area below the display 210, the T-bar 230 disposed in a lower left portion below the display 210 and operated by the user by shifting the bar to and fro to tilt, and the jog dial 240 disposed in a lower right portion below the display 210 and operated by the user by rotating the dial horizontally.

The display 210 displays the user interface corresponding to the signal and user input sent from the image server 101. Furthermore, the display 210 may be a touch panel display capable of detecting touch operations by the user to the display screen and a position at which the user touched the display screen, and it is possible to input data or request commands through the touch panel.

The button group 220 sends a signal to the image server 101 in response to the user pressing the button group 220. For example, selection buttons 220A-220C are buttons for selecting pieces of image data respectively taken by the camcorders 121-123 to play back the selected image data. By the user pressing any of the selection buttons 220A-220C, one of the pieces of the moving image data (for example, clip A to clip C as will be described later) corresponding to the selection button that has been pressed is selected. The selected moving image data is decoded by the decoder unit in the playback operation, and displayed on the decoder monitor 134 or transmitted externally.

The T-bar 230 sends a signal to the image server 101, the signal corresponding to the degree of the angle of the T-bar 230 that has been shifted by the user to or fro to tilt, and the playback speed of moving images to be played back, that is to say, the moving images that are to be displayed on the decoder monitor 134, can be adjusted in accordance with the degree of the angle of the T-bar 230.

The jog dial 240 sends a signal to the image server 101, the signal corresponding to a rotation speed of the jog dial 240 horizontally rotated by the user operation. For example, rotating the jog dial 240 faster increases the playback speed of the moving images (the playback speed of the moving images to be displayed on the decoder monitor 134), and stopping the rotation stops the playback of the moving images. Furthermore, if the jog dial 240 is rotated in the clockwise direction, playback is in the forward direction, and if the jog dial 240 is rotated in the counterclockwise direction, playback is in the backward direction.

It should be noted that, that functions of the controller 111 may also be carried out by way of a graphical user interface displayed on the system monitor 135 with the mouse 113 or the keyboard 112. The keyboard 112, the mouse 113, and the system monitor 135 may be connected to the bus of the editing apparatus 100. On the other hand, if the controller 111 is provided, the keyboard 112, the mouse 113, and the system monitor 135 are not required in the editing system 100, and may be omitted.

Figure 4:
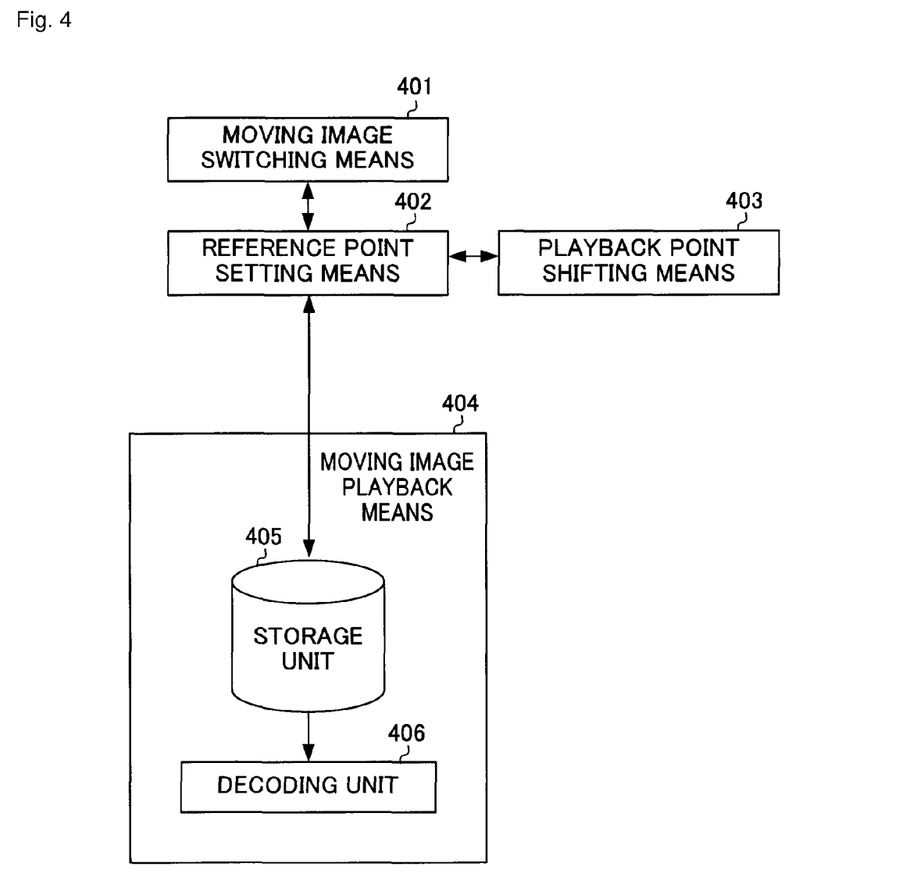
FIG. 4 is a functional configuration diagram of the embodiment of the editing apparatus according to the present invention.

FIG. 4 is a functional configuration diagram of an embodiment of the editing apparatus according to the present invention. As shown in FIGS. 2 and 4, by cooperation between the components shown in FIG. 2 and the programs, the editing apparatus implements a switching means 401, a reference point setting means 402, a playback point shifting means 403, and a playback means 404 including a storage unit 405 and a decoding unit 406. With the above-mentioned means, the CPU 271 executes: (1) a moving image editing and reference point setting function; and (2) a moving image playback function. The functions of the editing apparatus are described hereinafter.

(1) Moving Image Editing and Reference Point Setting Function

The CPU 271, by using the playback means 404, reads moving image data A stored in the storage unit 405, decodes the moving image data A by the decoding unit 406 and plays back the decoded moving image data. In response to a switching request to moving image data B from the user, the CPU 271 switches the moving image data A to the moving image data B by the switching means 401 and plays back the image data B. In response to the switching request, the reference point setting means 402 sets a reference point on the moving image data A corresponding to a portion of the moving image at a time point that has been last played back. This allows an automatic setting of a reference point only by submitting a switching request of moving image data, without requiring the user to set a reference point, thus allowing quick editing.

(2) Moving Image Playback Function

The CPU 271 shifts a playback point to the reference point on the moving image data A between the moving image data A and the moving image data B respectively with set reference points and stored in the storage unit 405, by using the playback point shifting means 403, in response to a playback point shifting request from the user to the moving image data A. And then, the CPU 271, in response to a playback start request from the user, starts playing back the moving image data A from the playback point, in other words, the reference point, by using the playback means 404. Subsequently, the CPU 271, in response to the playback point shifting request from the user to the moving image data B, stops playing back the moving image data A and shifts the playback point to the reference point on the moving image data B. Thereafter, the CPU 271 plays back the moving image data B using the playback means 404. This allows the playback from a predetermined reference point only by submitting the playback point shifting request, thus allowing quick playback. It should be noted that, in a case where moving image data stored in the storage unit 405 is not encoded, the decoding unit 406 is not used, and thus not required.

Figure 5:
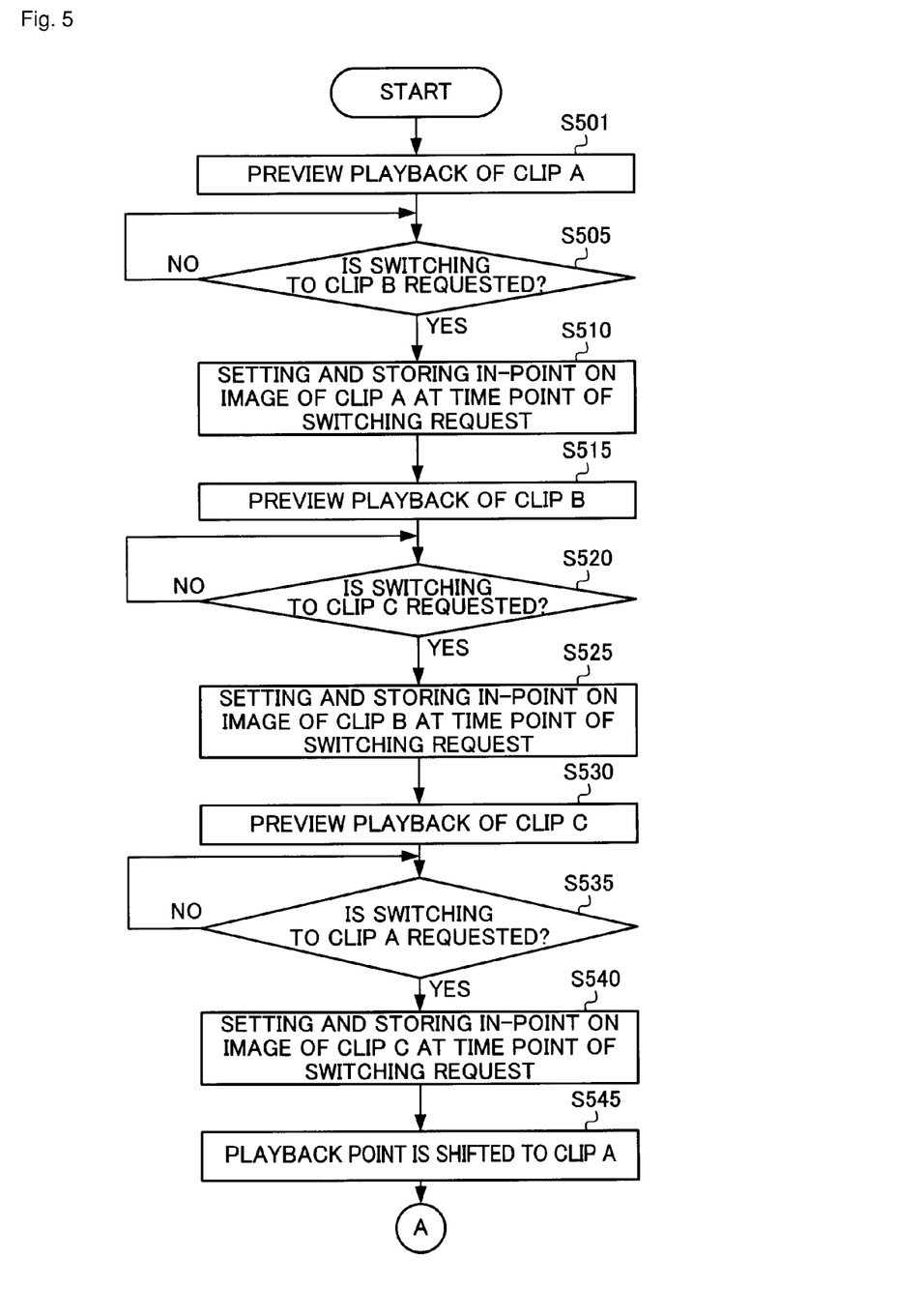
FIG. 5 is a flow chart illustrating a first part of an embodiment of an editing method according to the present invention.
Figure 6:
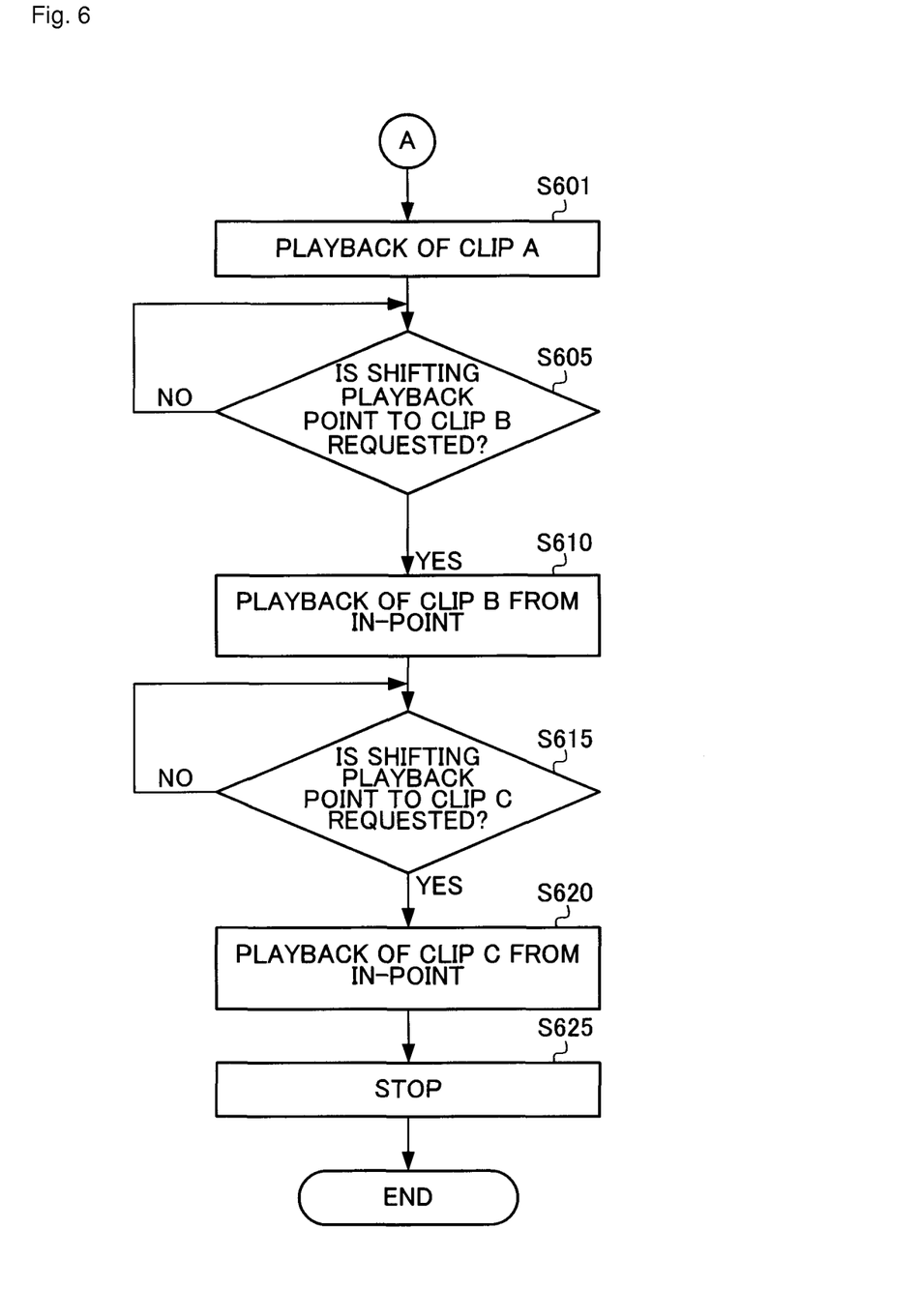
FIG. 6 is a flow chart illustrating a second part of the embodiment of the editing method according to the present invention.
Figure 7:
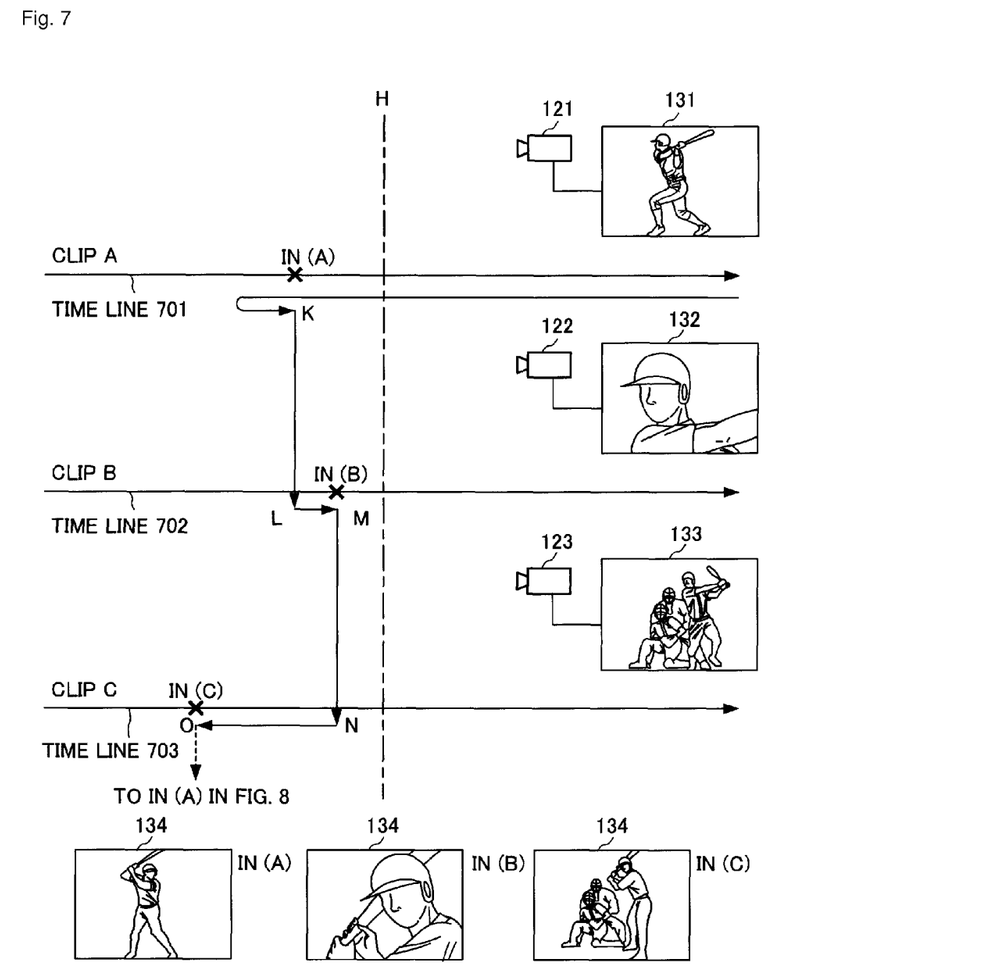
FIG. 7 is a schematic diagram illustrating a first part of the editing method.
Figure 8:
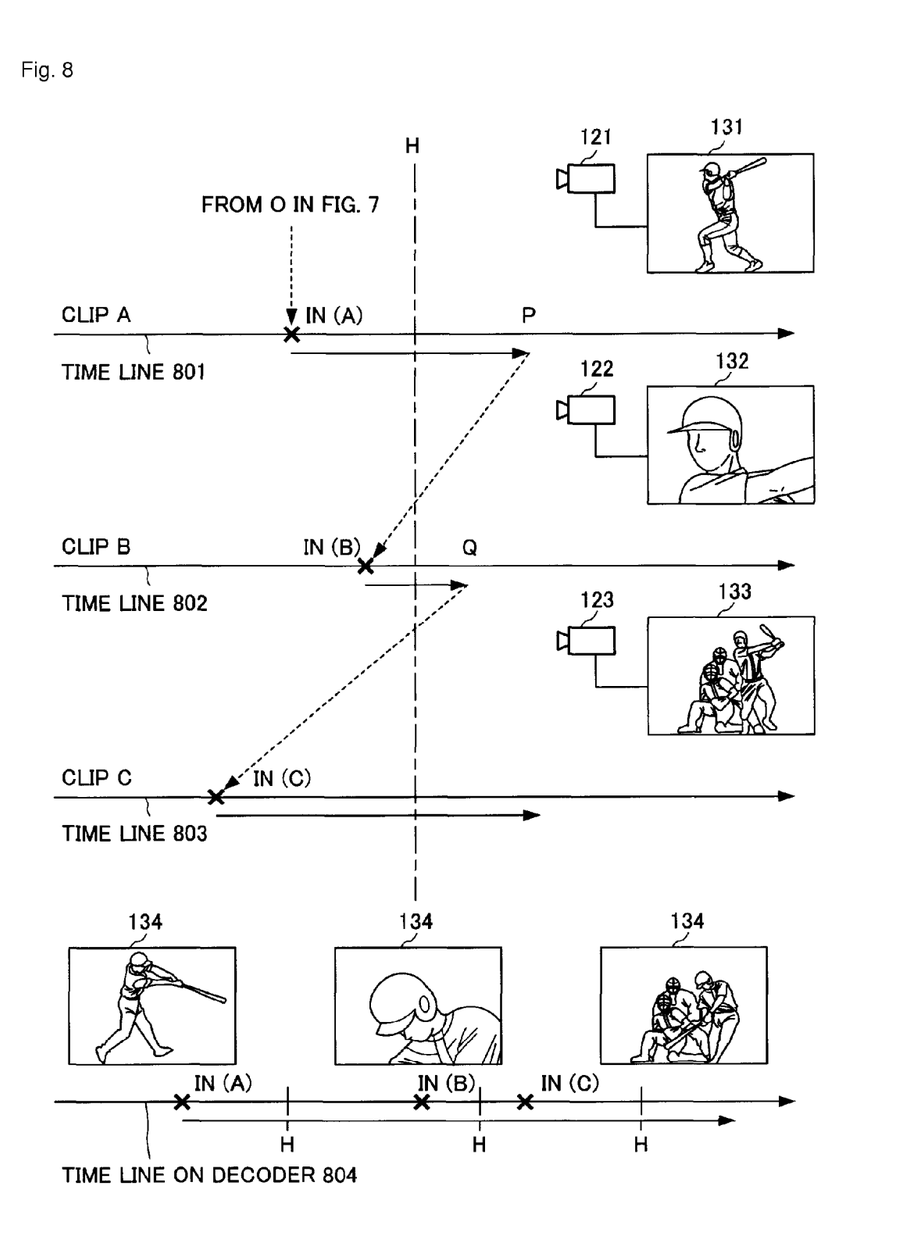
FIG. 8 is a schematic diagram illustrating a second part of the editing method.

FIGS. 5 and 6 are flow charts illustrating an embodiment of an editing method according to the present embodiment. FIGS. 7 and 8 are schematic diagrams illustrating an editing operation. The present embodiment of the editing method is described hereinafter with an example of live broadcasting of a baseball game. It should be noted that FIGS. 1 to 4 are referenced accordingly hereinafter.

As shown in FIG. 7, the camcorders 121-123 are taking images of a batter in a batter's box simultaneously from different angles: in a full-length figure; in a close-up shot; and in a distant shot from center field, as shown in camcorder monitors 131-133. Moving image signals respectively submitted from the camcorders 121-123 are encoded with time information by encoders (211 to 213 in FIG. 2) and stored in a hard disk drive 261 as collections of moving image data. Each collection of moving image data is referred to as a "clip". In the present example, the shot of the full-length figure of the batter is stored as clip A; the close-up shot of the batter is stored as clip B; and the distance shot of the batter from center field is stored as clip C. Time lines 701-703 show the time information of the clips A to C respectively as points on straight lines.

In the following description regarding Step S501 to Step S545 of FIG. 5 and regarding FIG. 7, the steps for setting an in-point on each of the clips A to C are described as a part of the editing operation. It should be noted that, the in-point is a start point for playing back each of the clips A to C (described later), which is one of the abovementioned reference points, in other words, reference points (markers) set on the time information of moving image data.

According to FIGS. 5 and 7, in Step S501, the CPU 271 first executes a preview playback of the clip A. In this step, the user executes a variable speed playback of the clip A by manipulating the jog dial 240, to locate a point on the moving image data where an in-point will be set. The controller 111 sends a signal to the CPU 271 in response to the manipulation of the jog dial 240, and then the CPU 271 shifts the playback point while the moving image data is played back. The user finds a point H where a batter has hit a home run and then shifts the playback point backward to a point K where the batter has taken a stance a short time before that.

More specifically, in Step S501, the CPU 271 switches to the clip A upon receiving the signal from the controller 111, in response to the user's input, for example, pressing the selection button 220A of the controller 111 corresponding to the clip A. In a case of reading the moving image data of the clip A while the camcorder 121 is taking images, the CPU 271 reads the latest replayable moving image data in the clip A, for example, moving image data located slightly before, for example, a few frames to some dozens of frames before the time point where the switching operation to the clip A was executed. Thus, the latest moving image data requested by the user can be quickly read. Alternatively, in a case where the camcorder 121 is not taking images, the moving image data at a predetermined point, for example at the beginning or at the end of the clip A, can be read. This allows the user to locate intended moving image data without erroneous operation, since the reading of the moving image data always starts from the predetermined point.

In this case, the clip A is still in recording; thus the CPU 271 reads the latest replayable moving image data of the clip A from the hard disk drive 261, decodes the read data by the decoder 241, and displays the decoded data on the decoder monitor 134. Further, the CPU 271 reads the moving image data sequentially, backwards from the latest point to the point H where the batter has hit a home run, in this case in accordance with a rewind playback operation, in other words a counterclockwise manipulation of the jog dial 240, and at a speed corresponding to the rotation speed of the jog dial 240, decodes the read data by the decoder 241, and displays the decoded data on the decoder monitor 134.

In Step S505, the CPU 271 determines whether a switching request to the clip B has been made or not. More specifically, the CPU 271 determines whether a switching request to switch to the clip B has been made or not based on whether the selection button 220B for the clip B has been pressed or not, in accordance with a signal from the controller 111. If it is determined that the switching request has been made, the process advances to Step S510. If it is determined that the switching request has not been made, the process returns to Step S505. In other words, the CPU 271 waits for the switching request to switch to the clip B by reiterating Step S505.

Next, in Step S510, the CPU 271 sets an in-point in(A) at the point K on the clip A in response to the switching request to switch to the clip B and stores the position of the in-point in(A), in other words the point K, to the memory 281. More specifically, the point K on the clip A is time information corresponding to the last moving image data played back on the clip A before switching to the clip B. The time information is a time code, for example. In a case where an instruction or the like is made by the controller 111, the position of the in-point can be stored in the hard disk drive 261. The user thus can set the in-point in(A) on the clip A by merely executing a switching operation to switch to the clip B. This does not require the user to set the in-point, thus allowing quick editing. It should be noted that the clip A is preferably paused (in a still mode) before making the switching request to switch to the clip B. By this, the in-point in(A) can be set on the still moving image data, thus allowing the user to set the in-point in(A) infallibly on the intended moving image data. It should be noted that, it is also preferable that the moving image data is paused before making a switching request to switch to the clip C (described later) and making the playback point shifting request for the clip A.

Next, in Step S515, a preview playback of the clip B is performed. Upon reception of the switching request to switch to the clip B from the controller 111, the CPU 271 moves the playback point from the point K on the clip A to a point L on the clip B having the same time information as the point K, and plays back the clip B from the point L. In other words, the CPU 271 starts playing back the clip B from the point L on the time line 702 having the same time information as the point K on the time line 701 of the clip A. As described above, by switching the playback point between the two points on the clips A and B sharing the same time information, the user can find more easily the moving image data on the clip B temporally close to and thus closely relating to the moving image data at the in-point in(A) on the clip A. This allows the user to quickly locate the intended point on the clip B.

It should be noted that a program for the editing apparatus may be configured so that, in the switching of the playback point between the clips A and B, the source point and the target point are in a predetermined chronological relationship. This configuration is helpful in a case where each clip has a substantially predetermined duration in an editing target.

The controller 111 sends a signal for shifting the playback point in response to the user's manipulation of the jog dial 240. The CPU 271 shifts, in response to the signal, the playback point to a point M, which is in proximity of the point H where the batter has hit the home run.

More specifically, the CPU 271 accepts a signal of the switching request to switch to the clip B from the controller 111, and stops playing back the clip A, in response thereto. The CPU 271 then reads the clip B, from the hard disk drive 261, sequentially from the moving image data having the same time information as that of the last played back moving image data on the clip A, and decodes the moving image data by the decoder 241. The controller 111 sends a signal in accordance with the manipulation of the jog dial 240. The CPU 271 then reads the clip B sequentially at a speed corresponding to the rotation speed of the jog dial 240 and decodes the clip B by the decoder 241.

Next, in Step S520, the CPU 271 determines whether a switching request to switch to the clip C has been made or not. More specifically, the CPU 271 determines whether a switching request to switch to the clip C has been made or not based on whether a clip C selection button 220C has been pushed or not, in accordance with a signal from the controller 111. If it is determined that the switching request has been made, the process advances to Step S525. If it is determined that the switching request has not been made, the process returns to Step S520. In other words, the CPU 271 waits for the switching request to switch to the clip C by reiterating Step S520.

Next, in Step S525, the CPU 271 sets an in-point in(B) at the point M on the clip B in response to the switching request to switch to the clip C and stores the position of the in-point in(B), in other words the point M, to the memory 281. More specifically, the point M on the clip B is time information corresponding to the last moving image data played back on the clip B before switching to the clip C. It should be noted that the setting and the storage of the in-point in(B) is similar to that of the in-point in(A), thus providing a similar effect.

Next, in Step S530, the CPU 271 starts a preview playback of the clip C. Upon reception of the switching request to switch to the clip C from the controller 111, the CPU 271 moves the playback point from the point M on the clip B to a point N on the clip C. In other words, the CPU 271 starts playing back the clip C from the point N on the time line 703 for the clip C, having the same time information as the point M on the time line 702 for the clip B. This also provides the same effect as that in the switching of the playback point from the clip A to the clip B. The controller 111 sends a signal in response to the user's manipulation of the jog dial 240. The CPU 271 shifts, in response to the signal from the controller 111, the playback point to a point O, which is remote from the point N where the batter has hit the home run. More specifically, the CPU 271 reads the clip C, from the hard disk drive 261, sequentially from the moving image data having the same time information as that of the last played back moving image data on the clip B, and decodes the moving image data by the decoder 241. The controller 111 sends a signal in accordance with the manipulation of the jog dial 240. The CPU 271 then reads the moving image data sequentially, in response to the signal from the controller 111, at a speed corresponding to the rotation speed of the jog dial 240 and decodes the moving image data by the decoder 241.

Next, in Step S535, the CPU 271 determines whether a switching request to switch to the clip A has been made or not. If it is determined that the switching request to switch to the clip A has been made according to the signal from the controller 111, the process advances to Step S540. If it is determined that the switching request to switch to the clip A has not been made, the process returns to Step S535. In other words, the CPU 271 waits for the switching request to switch to the clip A by reiterating Step S535. It should be noted that, in this case, the playback point is moved to the clip A, in order to start the playback from the clip A; however, the playback point may be also be moved to the clip B or the clip C.

Next, in Step S540, the CPU 271 sets an in-point in(C) at the point O and stores the position of the in-point in(C), in other words the point O, to the memory 281. Then the process advances to Step S545. The in-point in(C) is set and stored in a similar way as that of the in-point in(A), and thus the detailed description is not repeated.

In step S545, the CPU 271 moves the playback point from the point O to the in(A) on the clip A in response to a signal from the controller 111, representing the playback point shifting request to the clip A from the user. The process then advances to Step S601. The playback point shifting request to the clip A can be made, for example, by pressing a shift button 220D and press selection button 220A of the controller 111 corresponding to the clip A, as shown in FIG. 3. The controller 111 sends a signal in response to the pressing operation. The CPU 271, in response to the signal, switches to the clip A and reads the in-point in(A) stored in the memory 281 and prepares to read the moving image data at the in-point from the hard disk drive 261.

As described above, the in-points in(A) to in(C) are respectively set on the clips A to C. Each of the in-points in(A) to in(C) is set at a time point on a clip where moving image data is last played back before switching, in response to the switching request between clips, without any input operation by the user. This does not require the user to set the in-points, thus allowing quick editing.

In the following description regarding Step S601 to Step S625 of FIG. 6 and regarding FIG. 8, the steps are described for playing back the clips A to C, with the in-points being set, as a playback. Time lines 801 to 803 of FIG. 8 respectively show the time information of the clips A to C as points on a straight line.

As shown in FIGS. 6 and 8, in Step S601, the CPU 271 starts playing back the clip A from the in-point in(A). More specifically, if it is determined that the switching request has been made in the abovementioned Step S535 of FIG. 5, the CPU 271 prepares to read the clip A from the in-point in(A), from the hard disk drive 261. The CPU 271 reads the clip A sequentially from the in-point in(A) in response to a playback start request from the user, and outputs the moving image signal decoded by the decoder 241 to a transmitter 140 for broadcasting. The CPU 271 thus plays back the clip A from the in(A) on the time line 801, passing through the point H where the batter has hit a home run, to the point P. It should be noted that, a playback start request can be made on the controller 111, for example, by pushing the T-bar 230 forward from the position of speed 0, or by pressing any one of the button group 220.

Next, in Step S605, the CPU 271 determines whether a playback point shifting request to the clip B has been made or not. The user makes the playback point shifting request to the clip B, when the playback point has passed by the point H where the batter has hit a home run. The request can be made, for example, by pressing the shift button 220D and pressing the selection button 220B for the clip B of the controller 111. If it is determined that the playback point shifting request to the clip B has been made according to the signal from the controller 111, the process advances to Step S610. If it is determined that the playback point shifting request to the clip B has not been made, the process returns to Step S605. In other words, the CPU 271 waits for the switching request to switch to the clip B by reiterating Step S605.

Next, in Step S610, the CPU 271 stops reading the clip A and starts playing back the clip B from the in-point in(B), in response to the playback point shifting request to the clip B (in the case of YES in Step S605). More specifically, the CPU 271, in response to the signal, representing the playback point shifting request by the user, from the controller 111, stops reading the clip A from the hard disk drive 261, moves the playback point to the in-point in(B) on the clip B, starts reading sequentially the clip B therefrom, and outputs the moving image signal decoded by the decoder 241 from the output unit 251 to the transmitter 140. The CPU 271 thus plays back the clip B from the in(B) on the time line 802 for the clip B, passing through the point H where the batter has hit a home run, to the point Q.

Next, in Step S615, the CPU 271 determines whether the playback point shifting request to the clip B has been made or not. If it is determined that the playback point shifting request to the clip B has been made according to the signal from the controller 111, the process advances to Step S620. If it is determined that the playback point shifting request to the clip B has not been made, the process returns to Step S615. In other words, the CPU 271 waits for the switching request to switch to the clip B by re-iterating Step S615.

Next, in Step S620, the CPU 271 stops reading the clip B and starts playing back the clip C from the in-point in(C), in response to the playback point shifting request to the clip C (in the case of YES in Step S615). More specifically, the CPU 271, in response to the signal, representing the playback point shifting request, from the controller 111, stops reading the clip B from the hard disk drive 261, moves the playback point to the in-point in(C) on the clip C, starts reading sequentially the clip C therefrom, and outputs the moving image signal decoded by the decoder 241 from the output unit 251 to the transmitter 140. The CPU 271 thus plays back the clip C from the in(C) on the time line 803 for the clip C.

Next, in Step S625, the playback means 404 performs the playback for a predetermined period of time and stops the playback in response to an operation by the user. Alternatively, the playback may be terminated instead of stopped, by switching from the moving image transmitted from the editing apparatus 100 to an external moving image signal by an external switch. The moving image data of the clips A to C is thus transmitted. Switching between the in-points in(A) to in(C) can be executed by switching between the clips, in other words switching to the next clip to be played back, and the playback is continued from the in-point on the next clip, without requiring the user to make a direct input operation. This does not require the user to shift the in-point, thus allowing quick playback. It should be noted that, the playback in Steps S601, S610, and S620 is described as a forward playback at a normal speed; however, the playback may also be a slow playback, a fast forward playback, and a rewind playback.

As described above, according to the present embodiment, each of the in-points in(A) to in(C) is set, when the switching request between clips is made, at a time point on a clip where moving image data is last played back before switching, without any input operation by the user. This does not require the user to set the in-points, thus allowing quick editing. The quick editing further allows quick playback for broadcasting and transmission.

In addition, according to the present embodiment, the three clips A to C, which are encoded, can be edited by the single decoder 241. This allows a reduction of the number of expensive decoder chips included in the editing apparatus, thus lowering the price of the entire editing apparatus. Furthermore, more encoders can be added while maintaining the price of the editing apparatus using the cost cut by the reduced decoders, thus a larger number of signal input sources, for example, camcorders, can be connected. This allows the editing apparatus to provide a wider variety of moving image programs and moving image materials.

It should be noted that, in the present embodiment, the program is executed by the CPU 271 of the image server 101 to set the in-points and the like; however, the program may also be partially executed by the CPU 250 of the controller 111 in place of the CPU 271. Furthermore, the operation of the image server 101 may be controlled from the controller 111.

Further, the in-points in(A) to in(C) set on the clips A to C are stored in the memory 281 of the image server 101 in the present embodiment; however, the in-points may also be stored in the memory 260 of the controller 111 instead.

In addition, the abovementioned embodiment describes the device including the single image server 101 combined with the single controller 111; however, the present invention is not limited thereto. Alternatively, a plurality of image servers may be combined with a plurality of controllers, thus allowing selecting an arbitral server and then selecting a clip therefrom, using one of the controllers. Further, the in-points are set, in the abovementioned embodiment, in the following order: the clip A, the clip B, and the clip C; however, the order is not limited thereto. In addition, the number of the clips is not limited to three. For example, the number of clips may be two, or more than four. In a case where the clips are two, in FIG. 5, Steps S515 and S530 are carried out as a single step of the "preview playback of the clip B", Steps S520 and S525 are omitted, and in Step S540 after Step S535, "setting and storing the in-point on the moving image of the clip B at a time point of the switching request", and then the process advances to Step S545. Further, clips taken at different times may be used, in addition to clips taken around the same time using different camcorders.

The abovementioned embodiment describes in detail the editing of the encoded moving image data; however, the present invention can similarly edit moving image data that is not encoded, and can provide the similar effects as that in the above-mentioned embodiment.

It should be noted that the present invention is not limited to the abovementioned embodiment. The effect described in the embodiment of the present invention is merely an example of the most preferable effect of the present invention, and the effects of the present invention are not limited thereto.

For example, the broadcasting realized by the playback using the editing apparatus according to the present invention is not limited to ground-based broadcasting, satellite broadcasting, analog broadcasting, and digital broadcasting, and can also include multicast broadcasting and unicast broadcasting via the interne.

The invention claimed is:

1. An editing apparatus, comprising:
   a storage unit storing a first and second moving images;
   an output that provides the moving image to a display apparatus; and
   a processor that controls the editing apparatus, wherein the processor is configured to
   play back a first moving image and a second moving image from the storage unit in a forward or a rewind playback mode;
   switch playback between the first moving image and the second moving image;
   during playback of the first moving image in a rewind playback operation, in response to request of switching playback to the second moving image, automatically set an in-point of a video clip at a last played back position of the first moving image and, during playback of the second moving image, in response to a switching request from the second moving image, automatically set an in-point for the second moving image at a time point of the switching request; and
   play back a composite clip of the first moving image and the second moving image having the in-points automatically set, in response to a request to switch playback to the first moving image, when the first moving image has a previously set in-point.

2. The editing apparatus according to claim 1, wherein the first and second moving images have been taken around the same time, and the processor is configured to, during playback of the first moving image in the rewind mode, in response to request of switching playback to the second moving image, play back the second moving image from the same time point as a last played back position of the first moving image.

3. The editing apparatus according to claim 1, wherein the first and second moving images have been taken around the same time, and the processor is configured to, during playback of the first moving image in the rewind mode, in response to request of switching playback to the second moving image, play back the second moving image from a position that is spaced by a predetermined time period from the same time point as a last played back position of the first moving image to the same time point as the last played back position of the first moving image.

4. An editing apparatus according to claim 1, further comprising a single decoder unit, wherein the first and second moving images were encoded, and the processor is configured to decode and play back the encoded first or second moving image.

5. The editing apparatus according to claim 1, wherein the reference point is a marker for cueing.

6. The editing apparatus according to claim 1, further comprising a controller receiving an instruction from a user to provide the request of switching playback.

7. An editing method, comprising the steps of:
   playing back a first moving image from storage unit in a rewind playback operation via an editing apparatus;
   switching playback between the first moving image and the second moving;
   during playback of the first moving image in a rewind playback mode, in response to request of switching playback to the second moving image, automatically setting an in-point of a video clip at a last played back position of the first moving image, wherein the in-point is automatically set by submitting the switching playback request;
   automatically setting an in-point for the second moving image in response to a switching request from the second moving image, the in-point for the second moving image being set at a time point of the switching request; and
   playing back a composite clip of the first moving image and the second moving image having the in-points automatically set, in response to a request to switch playback to the first moving image, when the first moving image has a previously set in-point.

8. The editing method according to claim 7, wherein the first and second moving images have been taken around the same time, and the method further comprises, in the rewind playback mode, after the step of switching to the second moving image, a step of playing back the second moving image from the same time point as a last played back position of the first moving image.

9. The editing method according to claim 7, wherein the first and second moving images are encoded and stored in the storage unit, and in the step of playing back the first moving image, the encoded first or second moving image is decoded by a single decoder unit and played back.

10. The editing method according to claim 7, wherein the request of switching playback is provided by a controller in response to receiving an instruction from a user.

11. A non-transitory computer readable medium on which is recorded an editing program for causing a computer to execute the steps of:
   playing back a first moving image and a second moving image from storage unit in a forward or a rewind playback second mode;
   switching playback between the first moving image and the second moving image;
   during playback of the first moving image in a rewind playback operation the first mode, in response to request of switching playback to the second moving image, automatically set an in-point a reference point of a video clip at a last played back position of the first moving image and, during playback of the second moving image, in response to a switching request from the second moving image, automatically set an in-point for the second moving image at a time point of the switching request; and play back a composite clip of the first moving image and the second moving image having the in-points automatically set, in response to a request to switch playback to the first moving image, when the first moving image has a previously set in-point.

* * * * *